(12) United States Patent
Onno et al.

(10) Patent No.: US 7,382,922 B2
(45) Date of Patent: Jun. 3, 2008

(54) CREATION OF REMARKABLE REGIONS IN A DIGITAL IMAGE

(75) Inventors: Patrice Onno, Rennes (FR); Jeanne Guillou, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 681 days.

(21) Appl. No.: 10/874,572

(22) Filed: Jun. 24, 2004

(65) Prior Publication Data
US 2005/0013493 A1   Jan. 20, 2005

(30) Foreign Application Priority Data
Jul. 11, 2003   (FR) .................. 03 08549

(51) Int. Cl.
  *G06K 9/36* (2006.01)
  *G06K 9/46* (2006.01)
(52) U.S. Cl. ...................... 382/232; 382/240
(58) Field of Classification Search ............... 382/232, 382/233, 240, 276, 299; 358/1.15; 709/246, 709/247; 375/240.19, 240.24
See application file for complete search history.

(56) References Cited

U.S. PATENT DOCUMENTS

| | | | |
|---|---|---|---|
| 6,536,043 B1 | 3/2003 | Guedalia | 725/90 |
| 7,228,000 B2 * | 6/2007 | Sakuyama | 382/240 |
| 2003/0067627 A1 | 4/2003 | Ishikawa et al. | 358/1.15 |
| 2004/0086188 A1 * | 5/2004 | Owada | 382/233 |
| 2004/0170331 A1 * | 9/2004 | Henry | 382/233 |
| 2005/0013493 A1 * | 1/2005 | Onno et al. | 382/232 |

FOREIGN PATENT DOCUMENTS

| | | |
|---|---|---|
| EP | 1 274 247 | 1/2003 |
| WO | 01/65833 | 9/2001 |

OTHER PUBLICATIONS

Taubman, Remote Browsing Of JPEG2000 Images, IEEE JCIP2002, pp. I-229 to I-232 (2002).
Boliek, et al., JPEG 2000 for Efficient Imaging In A Client/Server Environment, Applications of Digital Image Processing XXIV, Proc. Of SPIE, vol. 4472, pp. 213 to 223 (2001).
Macromedia Flash 5, Using Flash, Macromedia, Inc., pp. 1 to 8 and 311 to 361 (2000).
Preliminary Search Report—French Patent Office (INPI—Rapport De Recherche Preliminaire) FA 636345/FR 0308549(Jan. 29, 2004).
U.S. Appl. No. 10/732,484, filed Dec. 11, 2003, J. Guillou et al.
Dec. 17, 2007 European Official Action in European Patent Application No. 04291667.6.

* cited by examiner

*Primary Examiner*—Amir Alavi
(74) *Attorney, Agent, or Firm*—Fitzpatrick, Cella, Harper & Scinto (57) ABSTRACT

A method of creating a remarkable region in a digital image encoded at a plurality of resolution levels, the encoding data being organized in packets, each packet comprising a field of encoded data, the method including the steps of: selecting at least one remarkable region in at least one resolution level of the image, selecting data packets corresponding to the selected region, constructing an encoded form comprising the selected packets and modified packets, the modified packets corresponding respectively to the packets not selected and comprising an empty data field defining an inaccessible region.

21 Claims, 8 Drawing Sheets

CREATION OF REMARKABLE REGIONS IN A DIGITAL IMAGE

FIELD OF THE INVENTION

The present invention generally relates to the creation of remarkable regions, as navigation regions, in a digital image.

BACKGROUND OF THE INVENTION

A remarkable region in an image is a portion of that image in which it is permitted to perform a zoom operation. That region of the image is thus accessible at a higher resolution than the rest of the image.

Techniques exist for navigating in an image stored on a server, from a client terminal connected to that server. For example, the Quicktime VR technique makes it possible among other things to zoom within an image in JPEG format. This technique is implemented in a software application available via the Internet at the address http://www.apple.com/quicktime. A description of the software is given in the work entitled "The Quicktime VR Book: Creating immersive imaging on your desktop" by Susan A. Kitchens from Paperback editions.

Thus, by virtue of this technique, it is possible, from the client terminal, to perform zoom and translation operations in the image stored on the server. A viewing window displays the result of the navigation at the client terminal.

For this, the image is stored at a plurality of predetermined resolutions on the server. Passing from a resolution to a higher resolution is by oversampling.

In this technique, there is strictly speaking no navigation or remarkable region in the image, since it is possible to navigate in the entire image.

Furthermore, image compression techniques exist which make it possible to define regions of interest. For example, image compression according to the JPEG2000 standard makes it possible to create one or more regions of interest in the image. The encoding data of a region of interest are situated at the beginning of the compressed file. It is however not possible to limit access to certain regions.

SUMMARY OF THE INVENTION

The object of the present invention is to remedy the drawbacks of the prior art, by providing a method and a device for creating a remarkable region in a digital image that is simple and flexible to implement.

To that end, the invention provides a method of creating a remarkable (or navigation) region in a digital image encoded at a plurality of resolution levels, the encoding data being organized in packets, each packet comprising a field of encoded data, characterized in that it comprises the steps of:
selecting at least one remarkable region in at least one resolution level of the image,
selecting data packets corresponding to the selected region,
constructing an encoded form comprising the selected packets and modified packets, the modified packets corresponding respectively to the packets not selected and comprising an empty data field defining an inaccessible region.

The invention makes it possible to exploit the fact that the image is encoded at a plurality of resolution levels to define navigation regions in the different resolutions.

Furthermore, the size of the file containing the encoded image is optimized as a function of the remarkable regions, since the data corresponding to the inaccessible regions are withdrawn. When that file has to be transmitted, for example between a server and a client terminal, this makes it possible to limit the volume of the data to be transmitted.

According to a preferred feature, the method further comprises the insertion of a marker and a segment of specific data in the encoding data. This marker and its segment of specific data are utilized on decoding of the image. It should however be noted that a decoder not knowing how to interpret that marker and its segment of specific data may decode the image.

According to a preferred feature, the data packets each further comprising a header, the headers of the modified packets correspond respectively to the headers of the packets not selected, those headers having been modified to indicate that the data fields are empty.

This makes it possible to define the regions in which a user may not navigate.

According to a preferred feature, if a selected packet has an empty data field, it is modified to have a non-zero length and an empty data field.

Thus, on decoding, it is not confused with a packet of a region in which a user cannot navigate.

According to a preferred feature, the constructed encoded form is a file of JPEG2000 type.

According to a preferred feature, the constructed encoded form is organized by sets of data blocks representing the same spatial region at the same resolution, each remarkable region corresponding to a finite number of sets of blocks.

According to a preferred feature, the constructed encoded form is inserted in an animation file.

According to a preferred feature, the display of a remarkable region of a given resolution comprises the graphical reproduction of the remarkable region of the resolution level immediately above, if it exists.

The remarkable region is for instance a zoomable portion of the image.

In a complimentary manner, the invention relates to a device for creating a remarkable (or navigation) region in a digital image encoded at a plurality of resolution levels, the encoding data being organized in packets, each packet comprising a field of encoded data, characterized in that it comprises:
means for selecting at least one remarkable region in at least one resolution level of the image,
means for selecting data packets corresponding to the selected region,
means for constructing an encoded form comprising the selected packets and modified packets, the modified packets corresponding respectively to the packets not selected and comprising an empty data field defining an inaccessible region.

The device according to the invention comprises means for implementing the features presented above and has similar advantages to those presented above.

The invention also relates to a digital apparatus including the device according to the invention or means for implementing the method according to the invention. The advantages of the device and of the digital apparatus are identical to those already set out.

An information storage means, which can be read by a computer or microprocessor, integrated or not into the device, and possibly removable, stores a program implementing the method according to the invention.

A computer program readable by a microprocessor and comprising one or more sequences of instructions is capable of implementing the methods according to the invention.

BRIEF DESCRIPTION OF THE DRAWINGS

The characteristics and advantages of the present invention will appear more clearly from a reading of a preferred embodiment illustrated by the accompanying drawings, in which.

DETAILED DESCRIPTION OF PREFERRED EMBODIMENTS

Figure 1:
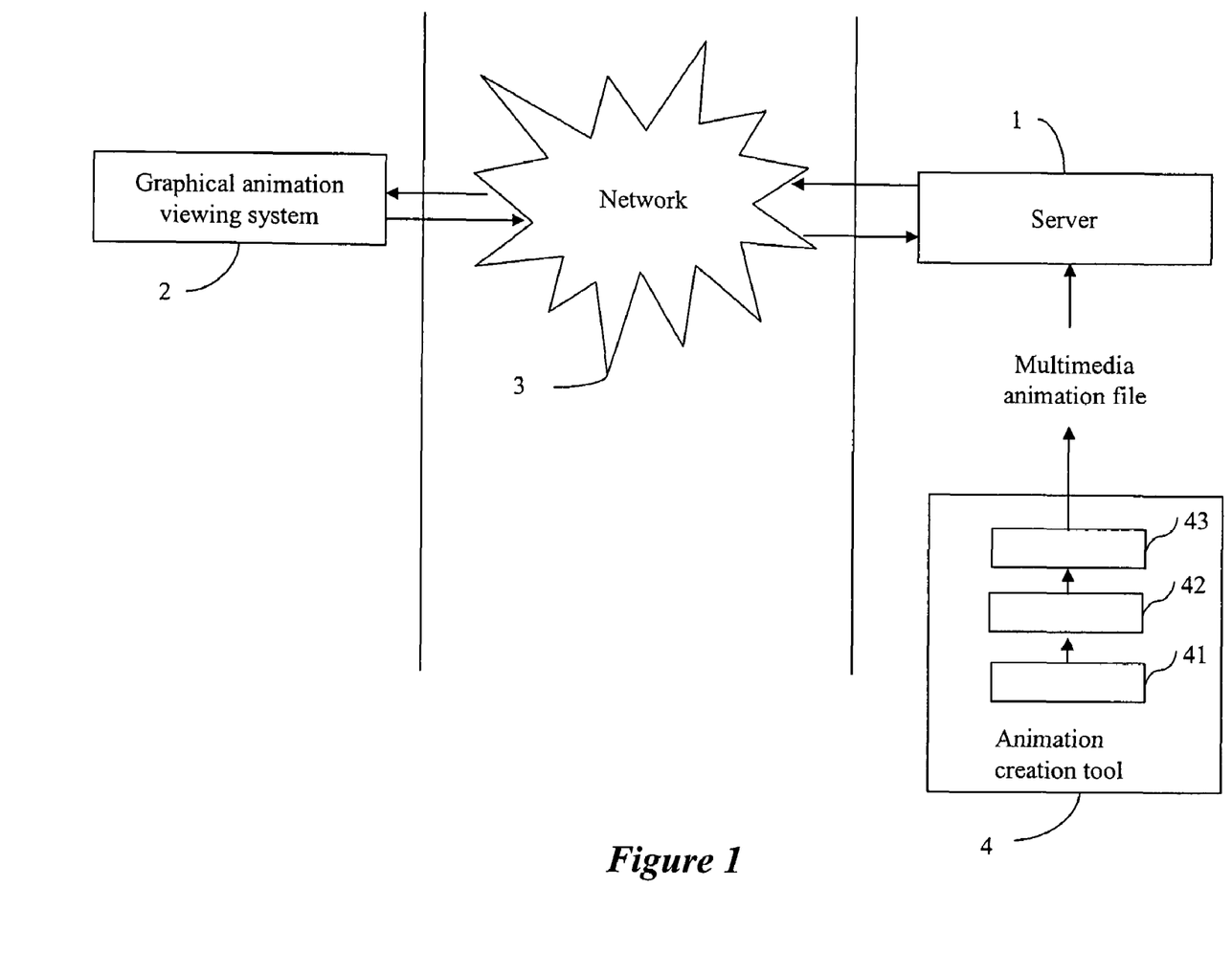
FIG. 1 represents a device for creating a file describing a digital image according to the invention and a corresponding device for reading a file describing a digital image.

According to the embodiment chosen and represented in FIG. 1, a server 1 is connected to a client terminal 2 via a communication network 3.

The server 1 and the client terminal 2 are for example computers, an example of the architecture of which is described below.

A tool 4 for the creation of multimedia animation makes it possible to create an animation file which is then served by the server. The animation is for example of the type known as "Flash" defined by the company Macromedia. The software application Flash MX for creating content in Flash format is available on the Internet at the address: http://www.macromedia.com/software/flash/.

The book entitled "Flash MX" by Guylaine Monnier, published by Dunod, Paris, 2002, describes that software application.

The animation is stored at the server, in the form of a file in SWF format. The SWF format is the format for Flash.

The case dealt with here is that in which an image in JPEG2000 format is integrated into the animation. It is desired to create remarkable regions in that image in which a user may navigate (i.e navigation regions). The image is encoded according to a plurality of resolution levels, the encoding data being organized into packets, each packet comprising a field of encoded data.

According to the invention, the device for creating a remarkable region in an digital image comprises:
  means 41 for selecting at least one remarkable (or navigation) region in at least one resolution level of the image,
  means 42 for selecting data packets corresponding to the selected region,
  means 43 for constructing an encoded form comprising the selected packets and modified packets, the modified packets corresponding respectively to the packets not selected and comprising an empty data field defining an inaccessible region.

The operation of the device for remarkable (or navigation) region creation is detailed in what follows.

The client terminal 2 comprises means for reading and decoding the SWF file. It also comprises means for displaying the animation, such as a display screen and means for navigating in an animation. As will be seen below, these means incorporate a JPEG2000 decoder which knows how to interpret a marker that is specific to the invention.

Figure 2:
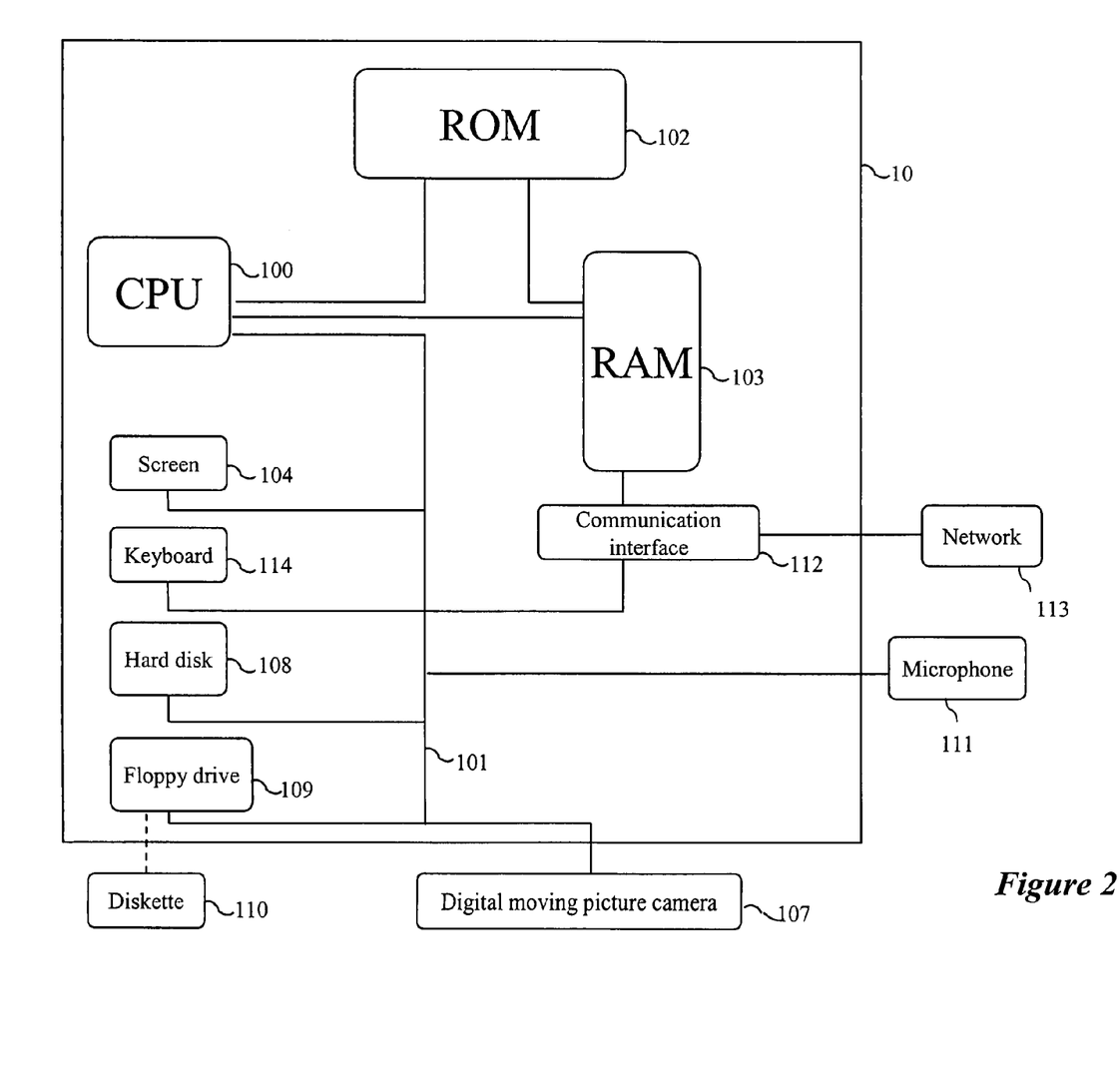
FIG. 2 represents an embodiment of a device implementing the invention.

As represented in FIG. 2, the server 1 is for example a microcomputer 10 connected to different peripherals, for example a digital camera 107 (or a scanner, or any image acquisition or storage means) connected to a graphics card and supplying information to be processed according to the invention.

The device 10 comprises a communication interface 112 connected to a network 113 able to transmit digital data to be processed or conversely to transmit data processed by the device. The device 10 also comprises a storage means 108 such as a hard disk. It also comprises a drive 109 for a disk 110. This disk 110 may be a diskette, a CD-ROM, or a DVD-ROM, for example. The disk 110 like the hard disk 108 can contain data processed according to the invention as well as the program or programs implementing the invention which, once read by the device 10, will be stored on the hard disk 108. According to a variant, the program enabling the device to implement the invention can be stored in read only memory 102 (referred to as ROM in the drawing). In a second variant, the program can be received in order to be stored in an identical fashion to that described previously via the communication network 113.

This same device has a screen 104 for displaying the data to be processed or serving as an interface with the user, who can thus parameterize certain processing modes, using the keyboard 114 or any other means (a mouse for example).

The central processing unit 100 (referred to as CPU in the drawing) executes the instructions relating to the implementation of the invention, which are stored in the read only memory 102 or in the other storage means. On powering up, the processing programs stored in a non-volatile memory, for example the ROM 102, are transferred into the random access memory RAM 103, which will then contain the executable code of the invention, as well as registers for storing the variables necessary for implementing the invention.

In more general terms, an information storage means, which can be read by a computer or microprocessor, integrated or not into the device, and which may possibly be removable, stores a program implementing the method according to the invention The communication bus 101 affords communication between the different elements included in the microcomputer 10 or connected to it. The representation of the bus 101 is not limiting and, in particular, the central processing unit 100 is able to communicate instructions to any element of the microcomputer 10 directly or through another element of the microcomputer 10.

The client terminal 2 is also a computer having an architecture similar to that of the server 1.

Figure 3:
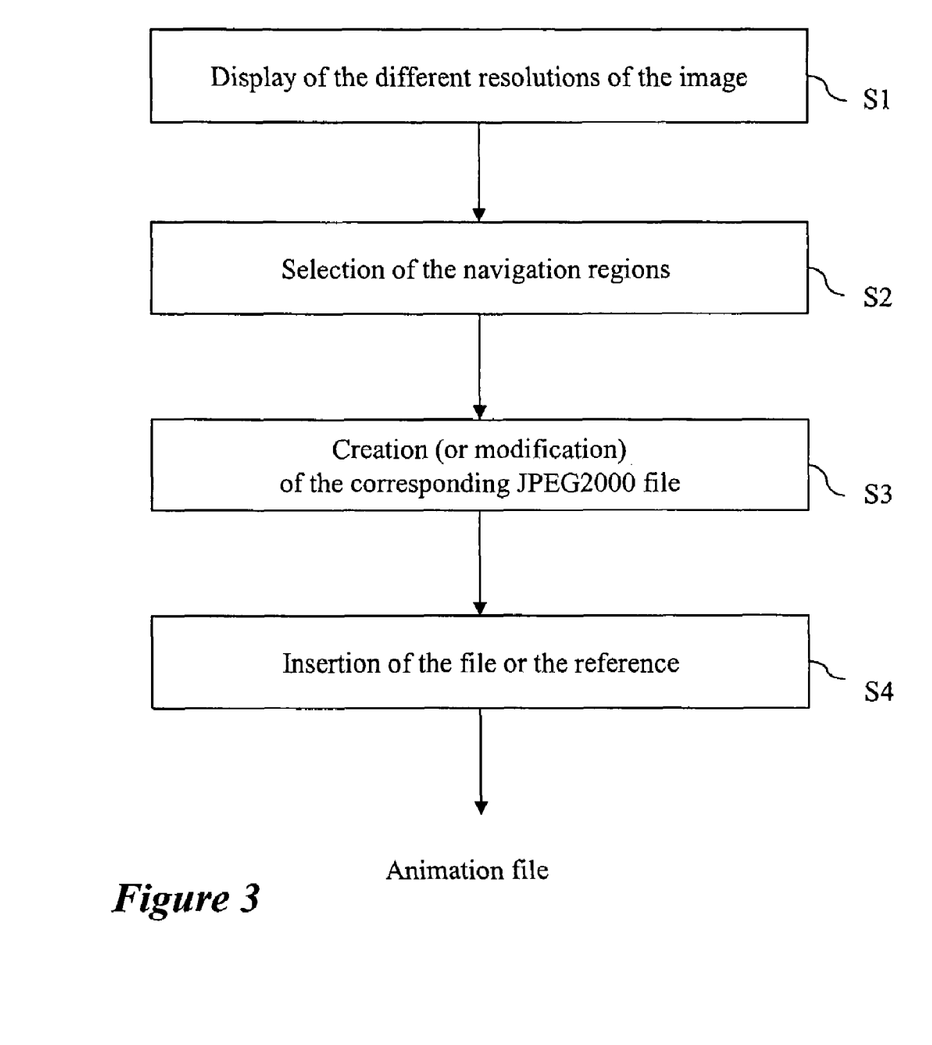
FIG. 3 represents an embodiment of a method of creating a file describing a digital image, according to the invention.

FIG. 3 represents an embodiment of a method of creating a file describing a digital image, according to the invention. This method is implemented in the server and comprises the steps S1 to S4.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

An image encoded in JPEG2000 format is considered.

Step S1 is a display of the different resolution levels of the image. This display is performed with the help of a JPEG2000 decoder. The number of resolution levels, or depth of the pyramid, depends on the prior encoding of the image.

As a variant, if the image is not encoded beforehand in JPEG2000 format, a multi-resolution pyramid is created from the original image. For example, a subsampling by two is performed in both the directions of the image.

The following step S2 is the selection by the creator of the remarkable (or navigation) regions in the resolution levels of the image. The creator utilizes for example a graphical interface and selects the remarkable regions by moving a pointer using the mouse of the computer.

Figure 4:
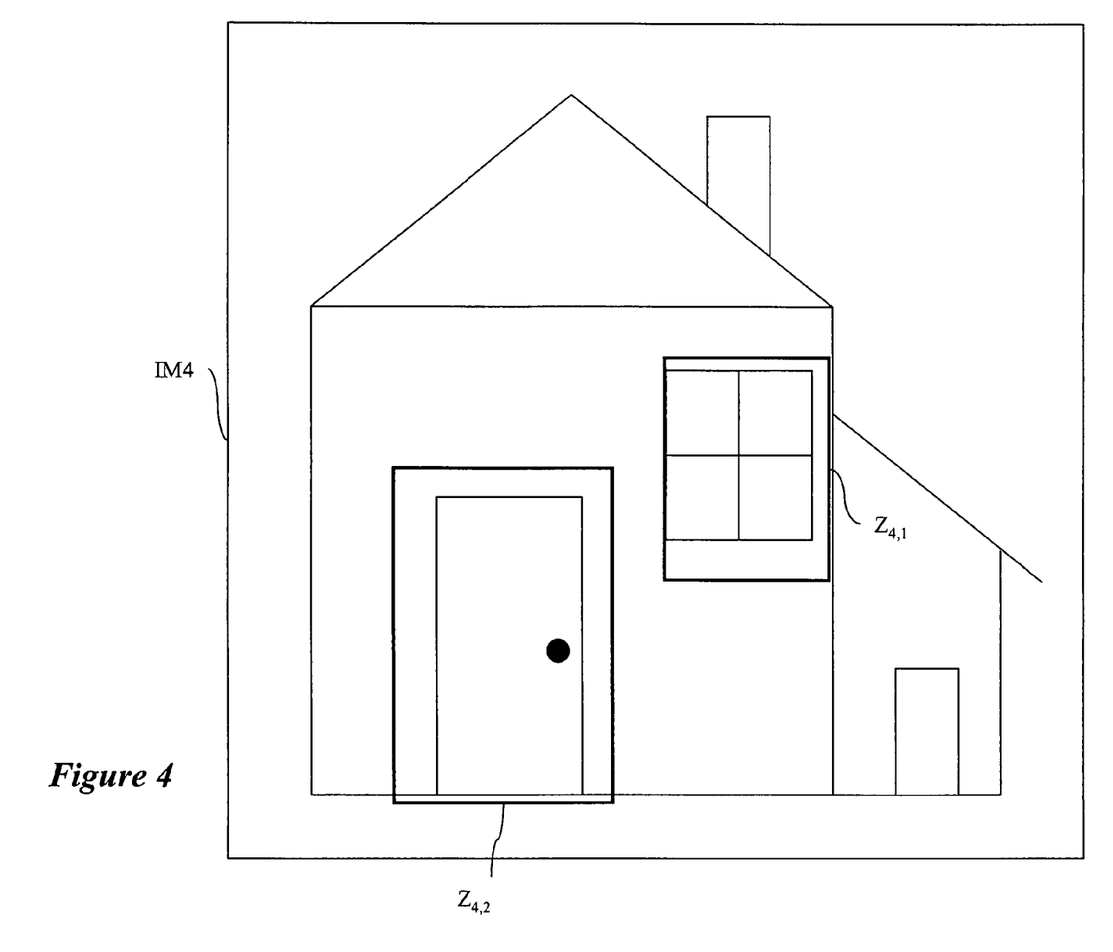
FIGS. 4 and 5 represent an image processed according to the invention.
Figure 5:
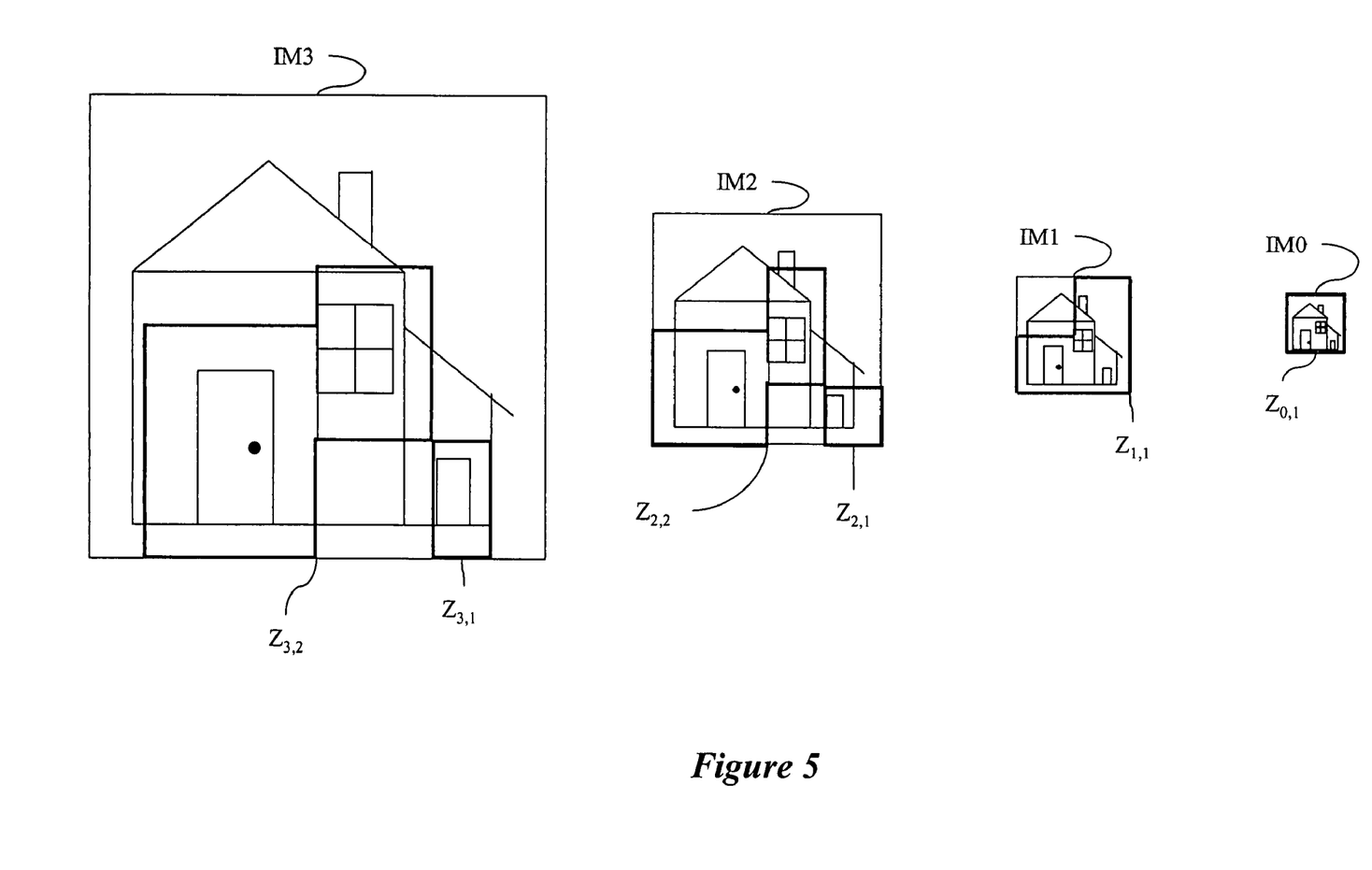

An image is represented in five resolution levels $IM_0$ to $IM_4$ in FIGS. 4 and 5.

The image $IM_4$ is the initial image at maximum resolution. The image $IM_3$ is obtained by a subsampling by two in both directions of the image $IM_4$. Similarly, going from image $IM_3$ to image $IM_2$, then from image $IM_2$ to image $IM_1$, and finally from image $IM_1$ to image $IM_0$, is by a subsampling by two in both directions.

These images may also be the result of decoding the JPEG2000 image at different resolutions.

The remarkable region $Z_{0,1}$ has been created in the image $IM_0$. It should be noted that it has been chosen equal to image $IM_0$.

The remarkable region $Z_{1,1}$ has been created in the image $IM_1$. The regions $Z_{2,1}$ and $Z_{2,2}$ have been created in the image $IM_2$. The regions $Z_{3,1}$ and $Z_{3,2}$ have been created in the image $IM_3$. Finally, regions $Z_{4,1}$ and $Z_{4,2}$ have been created in the image $IM_4$.

It should be noted that to enable navigation from one resolution to another, the regions defined at a given level of resolution must include the projections of the regions defined at the higher resolution levels.

Thus, for example, the projection of the regions $Z_{4,1}$ and $Z_{4,2}$ is included in the regions $Z_{3,1}$ and $Z_{3,2}$.

It should be noted that there is no match for the region $Z_{3,1}$ in the image $IM_4$. This means that it is possible to navigate in that the region between the resolutions $IM_0$ and $IM_3$, but not in the resolution $IM_4$.

Referring again to FIG. 3, step S2 is followed by step S3 which is the creation of a JPEG2000 image modified such that it only contains the data necessary for the navigation defined at the preceding step.

For this, it is necessary to identify the parts of the frequency sub-bands which are necessary for reconstructing the remarkable regions in the different resolutions of the image.

Figure 6:
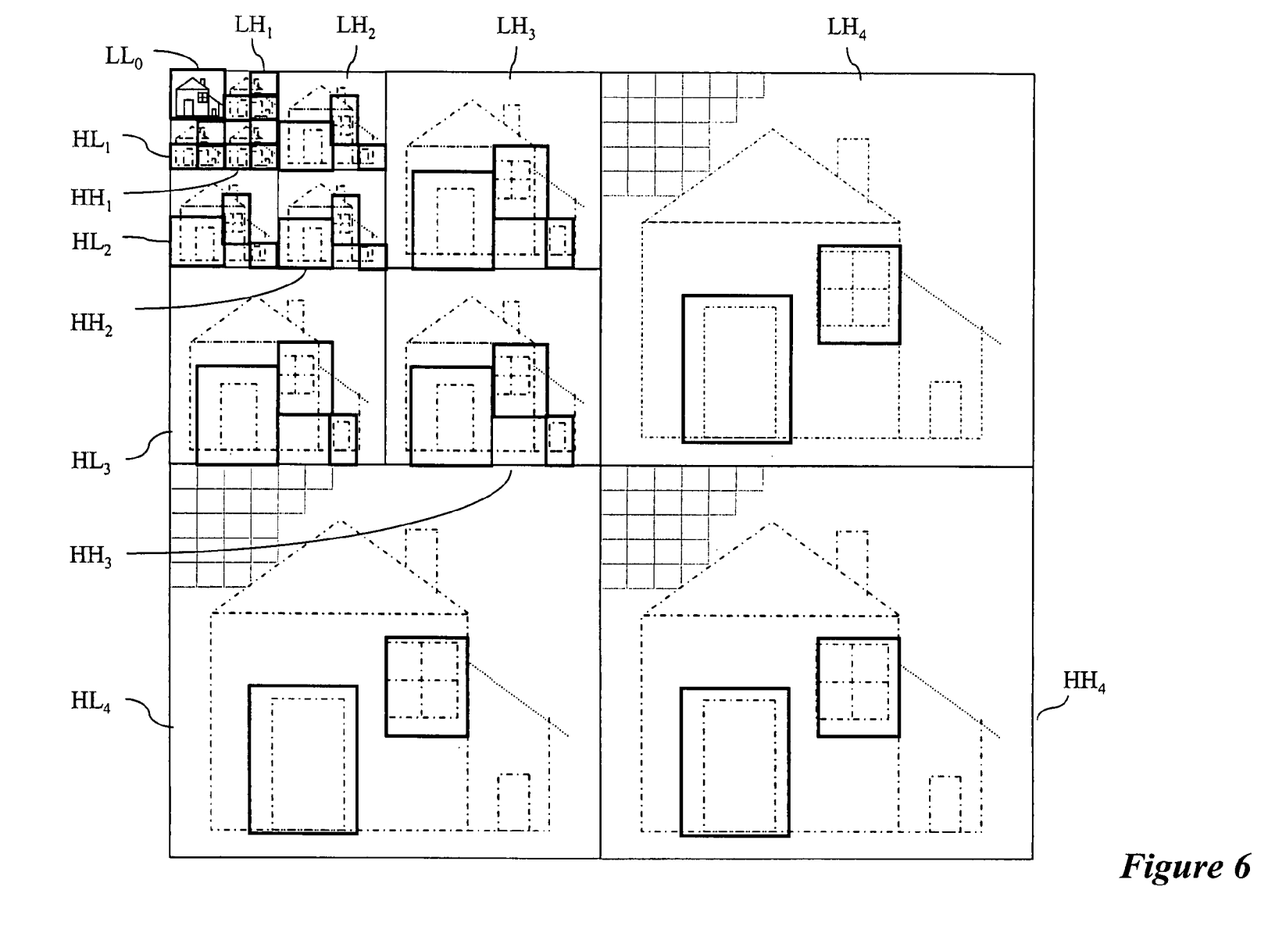
FIG. 6 shows a decomposition into frequency sub-bands of the image processed according to the invention.

FIG. 6 represents a decomposition into frequency sub-bands of the image $IM_4$.

The decomposition is conventional and is not detailed here. It results in the sub-bands $HL_4$, $LH_4$, $HH_4$, $HL_3$, $LH_3$, $HH_3$, $HL_2$, $LH_2$, $HH_2$, $HL_1$, $LH_1$, $HH_1$, and $LL_0$.

In each frequency sub-band, the data necessary for reconstructing the remarkable regions in the different resolutions of the image are represented by rectangles in the thick lines. For example, the rectangles drawn in thick lines in the sub-bands $HL_4$, $LH_4$ and $HH_4$ are the complementary data necessary to reconstruct the remarkable regions of the image $IM_4$, after having performed a zoom operation in the image $IM_3$.

Furthermore, the frequency sub-bands are divided into blocks, of which a few have been represented in the sub-bands $HL_4$, $LH_4$ and $HH_4$.

According to the JPEG2000 standard, a finite set of blocs representing the same spatial region at the same resolution is termed a "precinct". The upper size limit of a precinct is all the blocks of all the sub-bands of a resolution. The lower size limit of a precinct is a single block per sub-band in a resolution.

The size of the precincts may be predetermined. In this case, on selection of the remarkable regions in the resolutions by the creator of the animation, the sizes of the regions are multiples of the size of the precincts.

As a variant, the size of the blocks, and consequently that of the precincts, may be determined as a function of the size of the remarkable regions, such that the paving corresponds as closely as possible to a finite number of precincts in each region selected.

For example, the size of the precincts is equal to the size of the blocks. This size is chosen sufficiently small to be able to obtain a fine selection of the remarkable regions. The remarkable regions correspond exactly to a finite number of precincts.

The compressed file containing the encoding data is organized into packets. By definition, a packet contains a contribution of the encoding data of the precinct. Thus, the data of a precinct are represented by one or more packets corresponding to successive quality levels.

Consequently, a remarkable region is represented by one or more packets.

Figure 7:
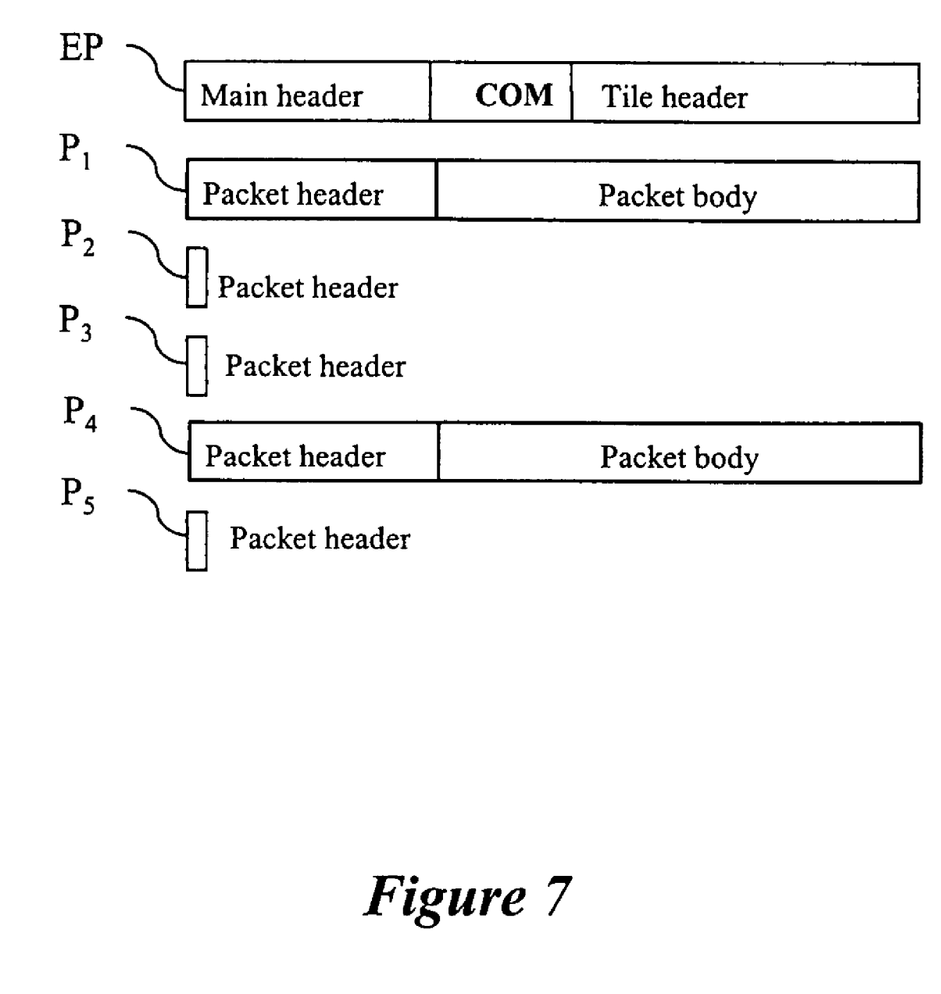
FIG. 7 represents the structure of the file containing the data of the image processed according to the invention.

FIG. 7 represents the structure of a JPEG2000 file according to the invention, resulting from step S3.

Conventionally the file comprises a main header EP and possibly a tile header. It is then organized into data packets.

In the JPEG2000 standard, it is possible to insert in the file a COM marker followed by a segment of data which is a comment.

According to the invention, a COM marker and a specific data segment to indicate the presence of remarkable (or navigation) regions are added into the main header EP. The segment of specific data indicates that the image has been processed according to the invention. On later decoding of the JPEG2000 file, the COM marker and its segment of specific data enable the decoder to recognize that the image comprises remarkable regions.

The packets, of which five have been represented, are either conventional packets, or modified packets.

By way of example, the packets $P_1$ and $P_4$ are conventional. They comprise a header and a data field. If the image processed was originally a JPEG2000 image, those packets are identical to those of the original image. Those packets contains data which correspond to the remarkable regions defined in the image.

The packets $P_2$, $P_3$ and $P_5$ are modified according to the invention. A packet modified according to the invention comprises a header and an empty data field. If the image processed was originally a JPEG2000 image, those packets are formed from those of the original image. Their header is modified to indicate that the data field is of zero length, and the data of the data fields are deleted.

These packets correspond to the regions in which a user may not navigate.

It should be noted that if an original packet is empty, and if that packet corresponds to a remarkable region, it is modified in order not to be confused with a packet corresponding to a region in which a user cannot navigate.

By construction, an empty packet is signaled by its first bit with the value zero to mean that it is of zero length. Conversely, a non-empty packet always commences by a bit with the value one. It is thus possible here to create a packet of which the content is empty, but of which the first bit has the value one. Thus, that packet will have a non-zero length but will contain no encoding data. That packet will not be confused with a packet corresponding to a region in which a user cannot navigate.

Referring again to FIG. 3, step S3 is followed by step S4 which is the insertion of the JPEG2000 file, or of its address, in the animation file.

The address of the JPEG2000 file is its URL (Uniform Resource Locator) reference.

In the context of a client-server application, it is preferred solely to insert the address of the image. The JPEG2000 data are transmitted to the client terminal solely when the user navigates in the image. In this case, the transmission protocol for JPEG2000 encoded data is utilized, also termed JPIP (ISO/IEC 15444-9).

Figure 8A:
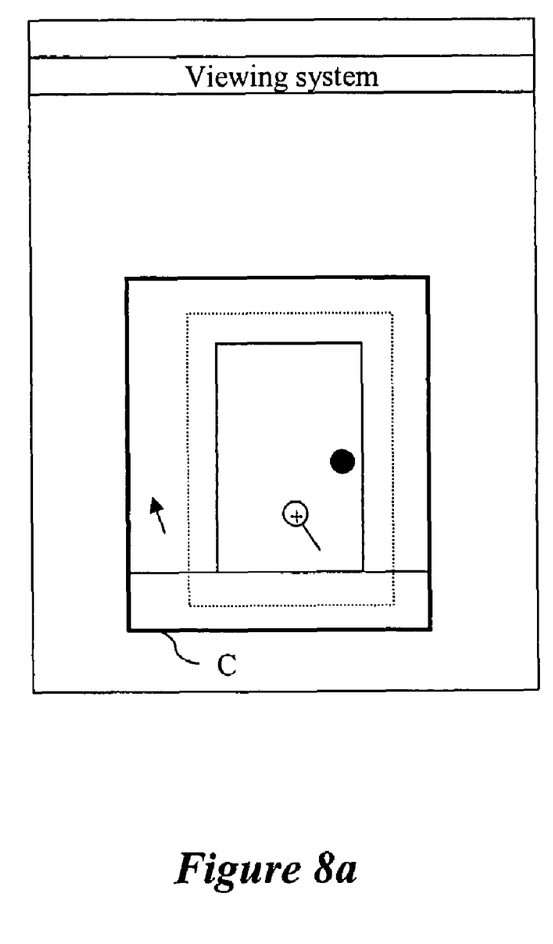
FIGS. 8a and 8b represent an example of navigation in the image processed according to the invention.
Figure 8B:
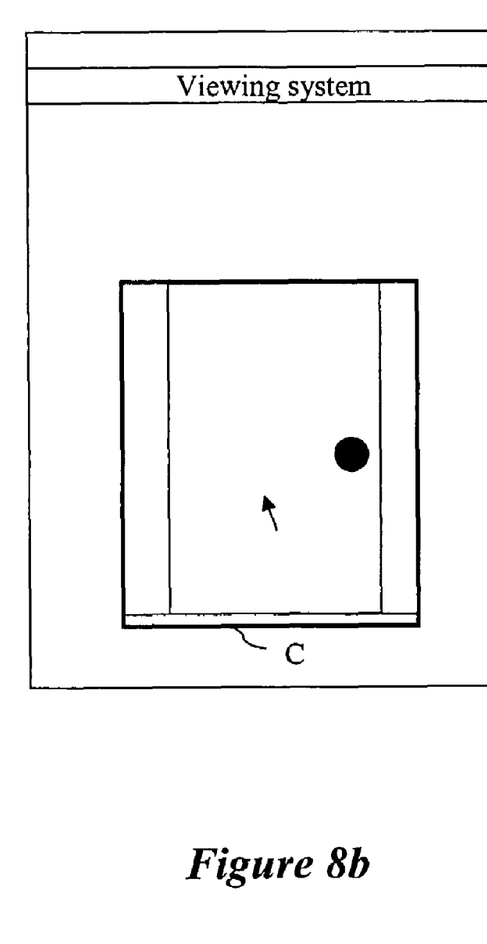

FIGS. 8a and 8b represent an example of navigation by a user. In these Figures, frame C represents a viewing window.

FIG. 8a represents the remarkable (or navigation) region of the image $IM_3$ visible in the viewing window C. This remarkable region itself contains the remarkable region of the image $IM_4$ represented by dotted lines.

A pointer that is movable by a mouse has the form of a magnifying glass in the remarkable region and the form of an arrow in the other regions. Thus, the user knows where he may navigate, that is to say perform a zoom or translation operation.

FIG. 8b represents a part of the region $Z_{4,2}$ obtained when the user clicks on the region in dotted lines in FIG. 8a. The viewing window is smaller than the remarkable region $Z_{4,2}$.

A zoom operation has been performed by downloading supplementary data contained in the sub-bands $LH_4$, $HL_4$ and $HH_4$ from the server. These supplementary data are decoded by the client terminal.

As the maximum resolution has been attained, no frame in dotted lines is displayed.

By virtue of the invention, the regions in which the user cannot navigate are not displayed. The COM marker and its data segment are a recognized by the decoder, which prevents the display of the regions containing empty packets If the JPEG2000 decoder does not know how to interpret the COM marker, the decoded image comprises regions for which encoded data are missing. There will then be regions without data or very blurred regions.

Of course, the present invention is in no way limited to the embodiments described and represented, but encompasses, on the contrary, any variant form within the capability of the person skilled in the art.

What is claimed is:

1. A method of creating a remarkable region in a digital image encoded at a plurality of resolution levels, the encoding data being organized in packets, each packet comprising a field of encoded data, the method comprising the steps of:
    selecting at least one remarkable region in at least one resolution level of the image,
    selecting data packets corresponding to the selected region, and
    constructing an encoded form comprising the selected packets and modified packets, the modified packets corresponding respectively to the packets not selected and comprising an empty data field defining an inaccessible region.

2. A method according to claim 1, further comprising the insertion of a marker (COM) and a segment of specific data in the encoding data.

3. A method according to claim 1, the data packets each further comprising a header, the headers of the modified packets corresponding respectively to the headers of the packets not selected, those headers having been modified to indicate that the data fields are empty.

4. A method according to claim 1, wherein, if a selected packet has an empty data field, it is modified to have a non-zero length and an empty data field.

5. A method according to claim 1, wherein the constructed encoded form is a file of JPEG2000 type.

6. A method according to claim 5, wherein the constructed encoded form is organized by sets of data blocks representing the same spatial region at the same resolution, each remarkable region corresponding to a finite number of sets.

7. A method according to claim 1, wherein the constructed encoded form is inserted in an animation file.

8. A method according to claim 1, wherein the display of a remarkable region of a given resolution comprises the graphical reproduction of the remarkable region of the resolution level immediately above, if it exists.

9. A method according to claim 1, wherein the remarkable region is a zoomable portion of the image.

10. An apparatus for processing a digital image, comprising means adapted to implement the method according to claim 1.

11. A device for creating a remarkable region in a digital image encoded at a plurality of resolution levels, the encoding data being organized in packets, each packet comprising a field of encoded data, the device comprising:
    means for selecting at least one remarkable region in at least one resolution level of the image,
    means for selecting data packets corresponding to the selected region, and
    means for constructing an encoded form comprising the selected packets and modified packets, the modified packets corresponding respectively to the packets not selected and comprising an empty data field defining an inaccessible region.

12. A device according to claim 11, further comprising means for inserting a marker (COM) and a segment of specific data in the encoding data.

13. A device according to claim 11, the data packets each further comprising a header, wherein the constructing means are adapted to form the headers of the modified packets such that they correspond respectively to the headers of the packets not selected, those headers having been modified to indicate that the data fields are empty.

14. A device according to claim 11, wherein the constructing means are adapted to modify a selected packet if it has an empty data field, in order for it to have a non-zero length and an empty data field.

15. A device according to claim 11, wherein the constructing means are adapted to construct an encoded form which is a file of JPEG2000 type.

16. A device according to claim 15, wherein the constructing means are adapted to construct an encoded form organized by sets of data blocks representing the same spatial region at the same resolution, each remarkable region corresponding to a finite number of sets.

17. A device according to claim 11, wherein the constructing means are adapted to insert the constructed encoded form in an animation file.

18. A device according to claim 11, comprising means for displaying a remarkable region of a given resolution with the graphical reproduction of the remarkable region of the resolution level immediately above, if it exists.

19. A device according to claim 11, wherein the remarkable region is a zoomable portion of the image.

20. A device according to claim 11, characterized in that the means for selecting and constructing are and incorporated in:

a microprocessor, a read only memory, comprising a program for processing the data, and a random access memory comprising registers adapted to record variables modified during the execution of said program.

21. An apparatus for processing a digital image, comprising the device according to claim 11 or 20.

* * * * *

UNITED STATES PATENT AND TRADEMARK OFFICE
CERTIFICATE OF CORRECTION

PATENT NO. : 7,382,922 B2
APPLICATION NO. : 10/874572
DATED : June 3, 2008
INVENTOR(S) : Patrice Onno et al.

It is certified that error appears in the above-identified patent and that said Letters Patent is hereby corrected as shown below:

COLUMN 1
    Line 59, "region," should read --region, and--.

COLUMN 2
    Line 49, "region," should read --region, and--.

COLUMN 3
    Line 17, "invention." should read --invention,--.
    Line 23, "invention," should read --invention, and--.
    Line 56, "an" should read --a--.
    Line 62, "region," should read --region, and--.

COLUMN 6
    Line 4, "blocs" should read --blocks--.
    Line 52, "contains" should read --contain--.

COLUMN 7
    Line 43, "a" should be deleted.
    Line 44, "packets" should read --packets.--.

COLUMN 9
    Line 6, "are and" should read --are--.

Signed and Sealed this

Ninth Day of December, 2008

JON W. DUDAS
*Director of the United States Patent and Trademark Office*